(12) United States Patent
Wang et al.

(10) Patent No.: US 8,522,223 B2
(45) Date of Patent: Aug. 27, 2013

(54) AUTOMATIC FUNCTION CALL IN MULTITHREADED APPLICATION

(75) Inventors: Cheng Wang, Santa Clara, CA (US);
Youfeng Wu, Palo Alto, CA (US);
Wei-Yu Chen, El Cerrito, CA (US);
Zhiwei Ying, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1646 days.

(21) Appl. No.: 11/603,375

(22) Filed: Nov. 22, 2006

(65) Prior Publication Data

US 2008/0120590 A1    May 22, 2008

(51) Int. Cl.
*G06F 9/45*      (2006.01)

(52) U.S. Cl.
USPC ............................ 717/149; 717/140; 718/106

(58) Field of Classification Search
None
See application file for complete search history.

(56) References Cited

U.S. PATENT DOCUMENTS

| | | | | |
|---|---|---|---|---|
| 5,363,121 A | * | 11/1994 | Freund ........................... | 718/101 |
| 5,371,891 A | * | 12/1994 | Gray et al. .................... | 717/140 |
| 5,481,708 A | * | 1/1996 | Kukol ............................ | 717/155 |
| 5,617,569 A | * | 4/1997 | Gray et al. ............................ | 1/1 |
| 6,189,144 B1 | * | 2/2001 | Weber ........................... | 717/162 |
| 6,966,057 B2 | * | 11/2005 | Lueh .............................. | 717/158 |
| 7,825,933 B1 | * | 11/2010 | Kilgard et al. ................. | 345/522 |
| 2002/0066022 A1 | * | 5/2002 | Calder et al. .................. | 713/200 |
| 2002/0144241 A1 | * | 10/2002 | Lueh .............................. | 717/136 |
| 2003/0066051 A1 | * | 4/2003 | Karr et al. ...................... | 717/114 |
| 2003/0159070 A1 | * | 8/2003 | Mayer et al. ................... | 713/201 |
| 2004/0015642 A1 | * | 1/2004 | Moir et al. ......................... | 711/1 |
| 2006/0085591 A1 | * | 4/2006 | Kumar et al. .................. | 711/113 |
| 2007/0169028 A1 | * | 7/2007 | Kasten et al. ................. | 717/140 |
| 2007/0169031 A1 | * | 7/2007 | Harris ............................ | 717/140 |
| 2009/0089520 A1 | * | 4/2009 | Saha et al. ..................... | 711/160 |

OTHER PUBLICATIONS

Adl-Tabatabai et al. "Compiler and runtime support for efficient software transactional memory", Jun. 2006, Proceedings of the 2006 ACM SIGPLAN conference on Progrfamming language design and implementation.*
Harris et al. "Composable memory transactions", 2005, Proceedings of the tenth ACM SIGPLAN symposium on Principles and practice of parallel programming.*
Saha, Bratin , et al., "HW Acceleration for a Software Transactional Memory System", U.S. Appl. No. 11/349,787, filed Feb. 7, 2006.
Ananiam, C. S., et al., "Unbounded Transactional Memory", *11th International Symposium on High Performance Computer Architecture, 2005.*, HPCA-11,(Feb. 12-16, 2005),316-327.
Baraz, Leonid , et al., "IA-32 Execution Layer: A Two-phase Dynamic Translator Designed to Support IA-32 Applications on Itanium-Based Systems", *MICRO-36*, (2003),11.
Harris, T. L., et al., "Language Support for Lightweight Transactions", *OOPSLA*, (2003),15.
Herlihy, M. , et al., "Software Transactional Memory for Dynamic-Sized Data Structures", *PODC*, (2003),10.

(Continued)

*Primary Examiner* — Jason Mitchell
(74) *Attorney, Agent, or Firm* — Ryder, Lu, Mazzeo and Konieczny, LLC; Douglas J. Ryder

(57) ABSTRACT

In general, in one aspect, the disclosure describes a method to detect a transaction and direct non transactional memory (TM) user functions within the transaction. The non TM user functions are treated as TM functions and added to the TM list.

11 Claims, 3 Drawing Sheets

(56) References Cited

OTHER PUBLICATIONS

Moore, Kevin E., et al., "LogTM: Log-based Transactional Memory", *12th Annual International Symposium on High Performance Computer Architecture (HPCA-12)*, (Feb. 11-15, 2006),12.

Rajwar, Ravi, et al., "Virtualizing Transactional Memory", *Proc. of the 32nd Annual International Symposium on Computer Artchitecture*, (Jun. 2005),12.

Shavit, N., et al., "Software Transactional Memory", *14th ACM Symposium on the Principles of Distributed Computing*, Ottowa, Ontario, Canada, (1995),33.

\* cited by examiner

US 8,522,223 B2

AUTOMATIC FUNCTION CALL IN MULTITHREADED APPLICATION

BACKGROUND

Symmetric multiprocessing (SMP) is a computer architecture that provides fast performance by making multiple CPUs available to complete individual processes simultaneously (multiprocessing). Any idle processor can be assigned any task, and additional CPUs can be added to improve performance and handle increased loads. A chip multiprocessor (CMP) includes multiple processor cores on a single chip, which allows more than one thread to be active at a time on the chip. A CMP is SMP implemented on a single integrated circuit. Thread-level parallelism (TLP) is the parallelism inherent in an application that runs multiple threads at once. A goal of CMP is to allow greater utilization of TLP. Parallel programming languages (e.g., OpenMP, TBB, CILK) are used for writing multithreaded applications.

Transactional memory allows multiple threads (cores) to utilize the same memory. Every thread completes its modifications to shared memory without regard for what other threads might be doing, recording every read and write that it makes in a log. Instead of placing the onus on the writer to make sure it does not adversely affect other operations in progress, it is placed on the reader, who after completing an entire transaction verifies that other threads have not concurrently made changes to memory that it accessed in the past. This final operation, in which the changes of a transaction are validated and, if validation is successful, made permanent, is called a commit. A transaction may also abort at any time, causing all of its prior changes to be rolled back or undone. If a transaction cannot be committed due to conflicting changes, it is typically aborted and re-executed from the beginning until it succeeds. This model guarantees a transaction to be executed atomically, consistently, and in isolation, and enables ordinary programmers to write correct and efficient concurrent applications without using locks.

To support software transactional memory or hardware assisted software transactional memory, the memory operations inside a transactional memory region (or simply a transaction) need to be checked for concurrency conflict detection and transaction rollback. Given a transaction boundary, compiler support for software transactional memory needs to automatically insert the special checking code for the transaction. This means that the code generated for the same piece of program text inside or outside a transaction will be different. Since real-world applications often have functions that are called both within and outside transactions, an efficient method to handle function calls inside transactions is needed in order to make transaction practical. Current STM systems either ask users to manually write TM version of the functions to be called inside a transaction, or do not allow function calls inside a transaction.

BRIEF DESCRIPTION OF THE DRAWINGS

The features and advantages of the various embodiments will become apparent from the following detailed description in which.

DETAILED DESCRIPTION

A programming language that automatically generates a transactional memory (TM) version of functions to be called inside a transaction is disclosed. This technique can efficiently support direct function calls as well as functions called through pointers. It also can allow calls to both user functions and library functions. In order to carry out the automatic TM transaction function for parallel programming languages (e.g., OpenMP, TBB, CILK), an associated compiler and library may be required to provide support.

Additional syntax may be created to identify transactions and to identify transaction-compatible functions (TM-functions). For example, OpenMP may add syntax "#pragma tm_atomic" to declare a transaction and "#pragma tm_function" to declare a TM-function.

Figure 1:
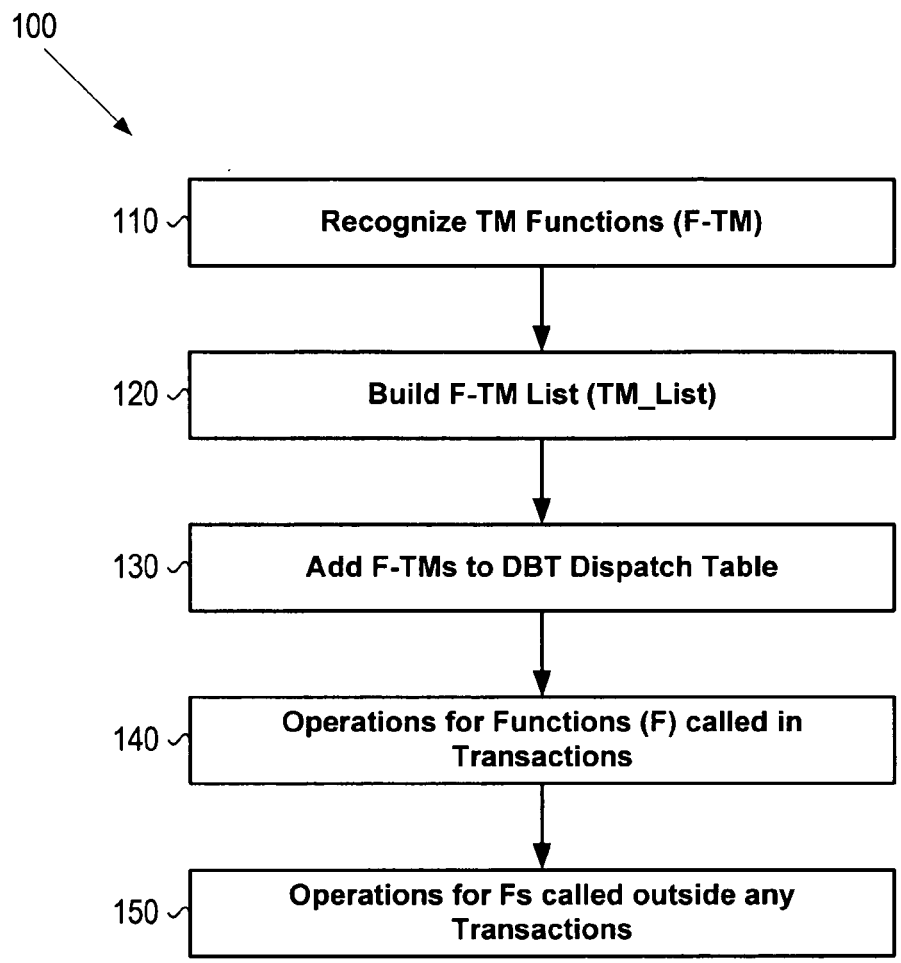
FIG. 1 illustrates an example flow chart for an example multithreaded application compiler with automatic function call, according to one embodiment.

FIG. 1 illustrates an example flow chart 100 of steps taken by an example multithreaded application compiler with automatic function call. The compiler recognizes each TM function based, for example, on the syntax used in the application (110) and builds a TM function list containing the TM functions recognized (120). The TM function entries are added to the DBT dispatch table (130). The compiler will then process various functions called within the transactions (140), and the various functions called outside any transactions (150).

Figure 2:
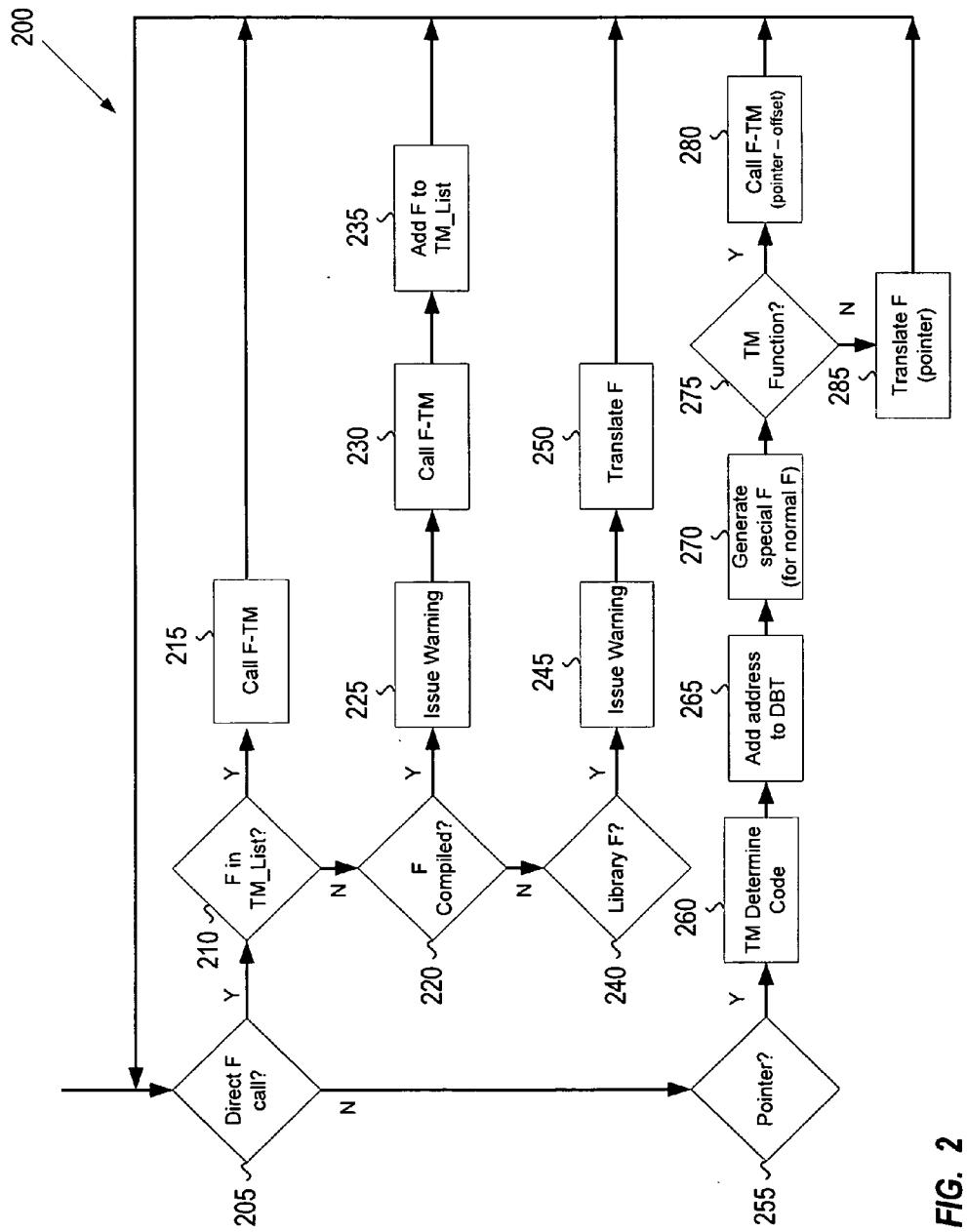
FIG. 2 illustrates example operations performed on functions called within a transaction, according to one embodiment.

FIG. 2 illustrates operations (200) performed on the functions called within a transaction (e.g., 140). A determination is made as to whether the function is a direct call (205). If the function is a direct function (205 yes), a determination is made as to whether the function is in the TM function list (210). If the function is in the TM list (210 yes), the TM version of the function is called (215). If the function is not in the TM list (210 no), a determination is made as to whether the function is compiled in the same compilation unit (e.g., its source is available) (220). If the function is compiled (220 yes), a compile-time warning is issued (225), the function is treated as a TM-function and added to the TM list (230) and the TM-function is called (235). If a function is not compiled (220 no), a determination is made to as whether the function is in a library (e.g., its source is not available) (240). If the function is a library function (240 yes), the compiler issues a warning (245) and converts the function call to invoke a translator, which will translate the binary function to a TM version at runtime (250). If the function is not a direct call (205 no) a determination is made as to whether the function is a pointer (255). For function calls through a pointer, the pointer always points to the normal version of function. If the function is a pointer (255 yes), code will be generated (260) to determine if the function pointed has a corresponding TM version.

If the TM version of the function exists the function address for the TM version of the function is placed at a fixed offset to the entry of the normal version (e.g., pointer-offset) for fast lookup from the function pointer. An empty call to a special empty function (e.g., special_empty_func) is inserted at the entry of each normal function that has a corresponding TM version. Since a binary library function does not have the call to the special function a quick check to determine whether a function has a corresponding TM version can be performed at runtime. The code generated (260) for each pointer function to determine if there is a corresponding TM function for the pointer function includes an if else statement regarding the presence of the special empty function (e.g., if (*F=="call_special_empty_func")) call **(pointer-offset), else call TRANSLATE(pointer)).

The addresses after the call TRANSLATE(pointer) are added to the DBT dispatch table (265). As a TM function called by a pointer within a transaction had the special empty function inserted at the entry of the normal function, if the normal function is called outside of the transaction there will be overhead to process the special empty function prior to processing the body of the normal function. In order to eliminate this overhead a special normal function (e.g., F_1) is created that the points to the body of the normal version of the function and excludes the special empty function (270).

During runtime, the if else statement is used to make a determination as to whether there is a corresponding TM function (275). If the pointer function points to the special empty function (275 yes) the TM version is called (e.g., call **(pointer-offset)) (280). If the pointer function does not point to the special empty function (275 no) the pointer function is not a TM function (is a library function) and the translate function is called (e.g., else call TRANSLATE (pointer)) which will translate the binary function to a TM version at runtime (285).

In summary, if an indirect call points to a user function, the function pointer is adjusted and the TM version is called. If the indirect call is determined to be a call to a library function, the dynamic binary translator (DBT) is invoked to convert the library function to a TM version.

Figure 3:
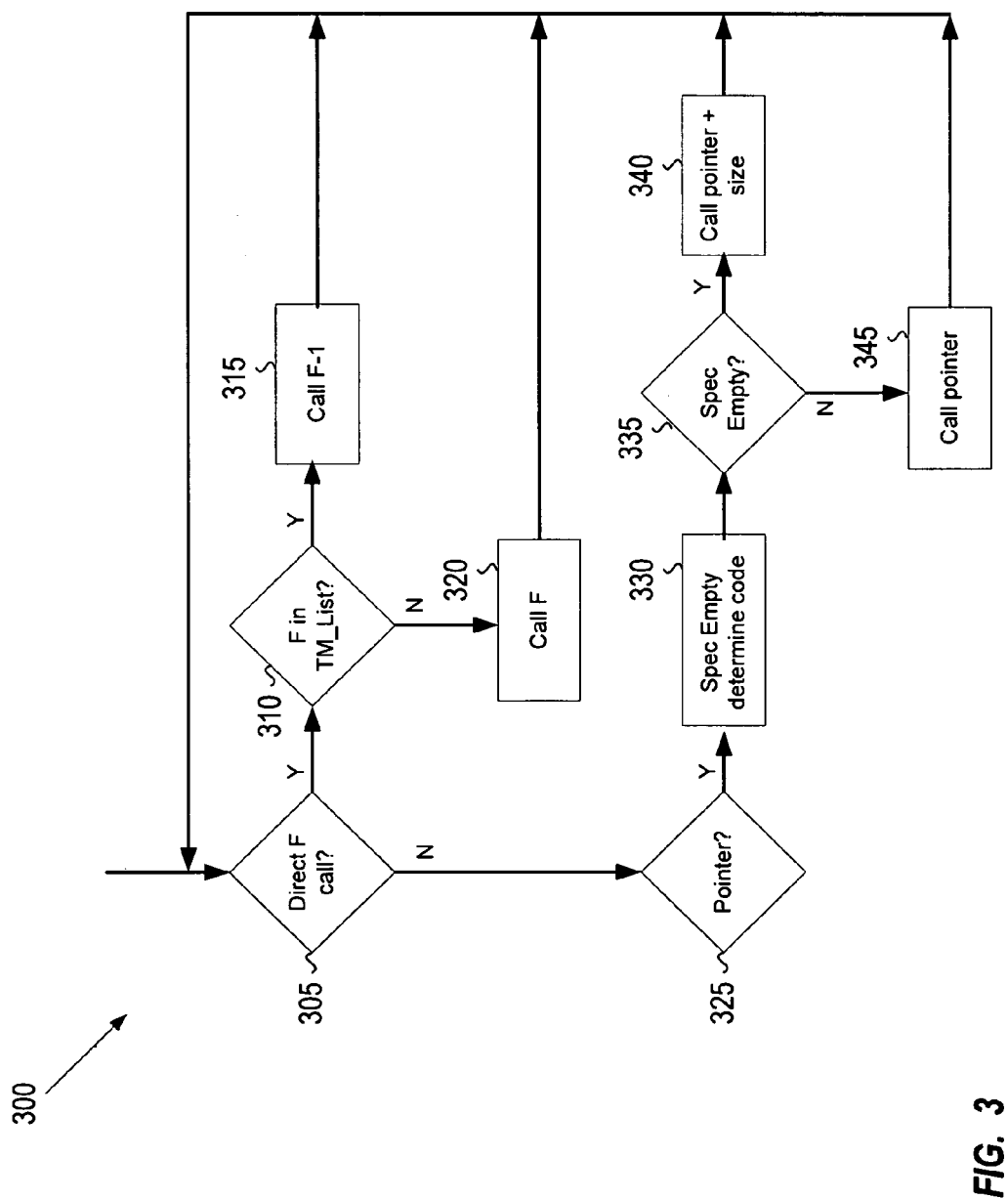
FIG. 3 illustrates example operations performed on functions called outside of any transaction, according to one embodiment.

FIG. 3 illustrates the operations (300) performed on functions called outside of any transaction (e.g., 150). A determination is made as to whether the function is a direct call (305). If the function is a direct function (305 yes), a determination is made as to whether the function is in the TM function list (310). If the function is in the TM list (310 yes), the F_1 function is called which is the equivalent to F except it skips the first instruction to call_special_empty_func (315). If the function is not a direct function (310 no), the function is called directly (320). If the function is not a direct function (305 no), a determination is made whether the function is a pointer (325). If the function is a pointer (325 yes) code is generated to determine whether the pointer points to a TM function via the special empty function (330).

If the pointer points to the special empty function (the TM function) overhead will be incurred processing the empty function inserted at the entry of each normal function. In order to avoid this overhead the pointer may be advanced by the size of the instruction to call the special empty function (e.g., pointer+size). The code generated (330) for each pointer function includes an if else statement regarding the special empty function (e.g., if (*F=="call_special_empty_ func") call*(pointer+size), else call *pointer).

During runtime, the if else statement is used to make a determination as to whether the pointer points to a corresponding TM function (335). If the pointer function points to the special empty function (335 yes) the pointer is advanced by the size of the instruction (e.g., call **(pointer+size)) (340). If the pointer function does not point to the special empty function (335 no) the pointer function is called (e.g., else call *pointer) (345).

In summary, if an indirect call points to the special empty function, the function pointer is adjusted and the adjusted pointer is called. If the indirect call does not point to the special empty function, the function pointer is called.

For the TM functions in the TM list that were library functions (e.g., 250, 285) the functions are converted to TM functions by the compiler (using a lightweight DBT). The compiler invokes the DBT with the address of the called function for translation. The DBT starts to translate the code at the address and run the translated code from the translated code cache.

To determine when the DBT should stop the translation and go back to the normal execution of compiler generated TM code, the compiler code generation will add the entry points to the TM version of code, including all the TM function entries and function call return points, to the DBT's runtime dispatch table. Since the DBT uses the dispatch table to decide whether a control transfer target should be translated or directly connected, the added entry points in the table will naturally lead the DBT to go back to the compiler generated TM code for execution. DBT also puts the starting address of the translated function into the dispatch table.

Once a library function is translated, late calls to the same function should not invoke the DBT again. To accomplish this, a table (e.g., Translation Linkage Table (TLT)) similar to the Procedure Linkage Table (PLT) is built for shared libraries. Each call to a library function is built to be a call to the routine's entry in the TLT. The first time the library function is called, the TLT entry contains the DBT entry point to translate the function. After that, the TLT entry contains the starting address of the translated function, so after the first call, the cost of using the TLT is a single extra indirect jump at a function call, and nothing at a return. This scheme works well for direct calls to library functions. For an indirect call, however, the library function pointed to by the pointer may change at runtime. Consequently, the starting address of the currently translated function cannot be placed in the TLT entry even after the first call. Instead, a dispatch table lookup routine is placed in that entry. The lookup routine searches the dispatch table to determine if the current function pointer is to an already translated function. If so, the translated function is directly called. Otherwise, DBT is invoked to translate the indirectly called function. Notice that, if the program text segment can be modified, the TLT can be avoided and directly patch the DBT invocation code to either directly call the translated code or the lookup routine.

Notice that since the code translated by the DBT is within a transaction and the transaction rollback mechanism can be used to enforce precise exception, the DBT can optimize the code aggressively with runtime information. Thus the runtime translated code could potentially be as efficient as the statically translated code.

A program may also perform system calls in transactions. Most system calls have non-recoverable side effects and should not be allowed in transactions. This compiler will maintain a list of non-recoverable system calls. When a system call in the list is detected, either during static checking in the compiler and dynamic checking in the DBT, an error will be reported.

Various embodiments were described above with specific reference made to the OpenMP parallel processing language. The various embodiments are in no way intended to be limited thereto but could be applied to any parallel programming language (e.g., CILK, TBB) without departing from the current scope. The compilers and libraries associated with any parallel programming language could be modified to incorporate clustering by locality.

The various embodiments were described with respect to multiprocessor systems with shared memory (e.g., SMP, CMP) but are not limited thereto. The various embodiments can be applied to any system having multiple parallel threads being executed and a shared memory amongst the threads without departing from the scope. For example, the various embodiments may apply to systems that have a plurality of microengines that perform parallel processing of threads.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

An embodiment may be implemented by hardware, software, firmware, microcode, or any combination thereof. When implemented in software, firmware, or microcode, the elements of an embodiment are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

All or part of an embodiment may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

An embodiment may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various embodiments are intended to be protected broadly within the spirit and scope of the appended claims.

What is claimed:

1. A method implemented by a transactional memory (TM) compiler, the method comprising
    recognizing a function declared as being TM compatible by a programmer within a parallel programming application;
    automatically creating a TM version of the function declared as being TM compatible by:
        adding static code to check for concurrency conflict detection and transaction rollback;
        automatically storing an address of the TM version of the function a fixed offset from the location of the function declared as being TM compatible;
        automatically adding a call to an empty function at the beginning of the function declared as being TM compatible that has a TM version; and
        automatically adding static code for a pointer utilized within the TM version of the function to check whether a function pointed to includes a call to the empty function, and at runtime:
            if the function pointed to includes the call to the empty function, calling a function at an address stored the fixed offset from the function pointed to; or
            if the function pointed to does not include a call to the empty function, calling a translate function that will translate the function pointed to into a TM version thereof at runtime.

2. The method of claim 1, further comprising automatically adding static code for a pointer utilized outside of the transaction to check whether the function pointed to has a TM version by determining if the function pointed to includes the call to the empty function and routing calls based thereon.

3. The method of claim 2, wherein the added static code checks whether a function pointed to includes a call to the empty function, and at runtime if the function pointed to includes the call to the empty function, skipping the call to the empty function.

4. The method of claim 1, wherein the recognizing a function declared as being TM compatible includes recognizing a specific command.

5. The method of claim 1, further comprising recognizing a transaction declared by the programmer within the parallel programming application, wherein the recognizing a transaction includes recognizing a specific command.

6. An transactional memory (TM) compiler to:
    recognize a function declared as being TM compatible by a programmer within a parallel programming application;
    automatically create a TM version of the function declared as being TM compatible by:
        adding static code to check for concurrency conflict detection and transaction rollback;
        automatically store, in a memory, an address of the TM version of a function a fixed offset from the location of the function declared as being TM compatible;
        automatically add a call to an empty function at the beginning of the function declared as being TM compatible that has a TM version; and automatically adding static code for a pointer utilized within the TM version of the function to check whether a function pointed to includes a call to the empty function, and at runtime:
if the function pointed to includes the call to the empty function, calling a function at an address stored the fixed offset from the function pointed to; or
if the function pointed to does not include a call to the empty function, calling a translate function that will translate the function pointed to into a TM version thereof at runtime.

7. The TM compiler of claim 6 that is further to add static code for a pointer utilized outside of the transaction to check whether the function pointed to has a TM version by determining if the function pointed to includes the call to the empty function and routing calls based thereon.

8. The unmanaged language TM compiler of claim 7, wherein the added static code checks whether a function pointed to includes a call to the empty function, and at runtime if the function pointed to includes the call to the empty function, skipping the call to the empty function.

9. A system comprising
a multicore processor;
memory coupled to the processor to store a parallel programming application, the application when executed causing the processor to perform certain functions in parallel threads; and
a transactional memory (TM) compiler to:
recognize a function declared as being TM compatible by a programmer within a parallel programming application;
automatically create a TM version of the function declared as being TM compatible by:
adding static code to check for concurrency conflict detection and transaction rollback;
automatically store an address of the TM version of the function declared as being TM compatible a fixed offset from the location of the function declared as being TM compatible;
automatically add a call to an empty function at the beginning of the function declared as begin TM compatible that has a TM version; and
automatically adding static code for a pointer utilized within the TM version of the function to check whether a function pointed to includes a call to the empty function, and at runtime:
if the function pointed to includes the call to the empty function, calling a function at an address stored the fixed offset from the function pointed to; or
if the function pointed to does not include a call to the empty function, calling a translate function that will translate the function pointed to into a TM version thereof at runtime.

10. The system of claim 9, wherein the TM compiler is further to add static code for a pointer utilized outside of the transaction to check whether the function pointed to has a TM version by determining if the function pointed to includes the call to the empty function and routing calls based thereon.

11. The system of claim 10, wherein the added static code checks whether a function pointed to includes a call to the empty function, and at runtime if the function pointed to includes the call to the empty function, skipping the call to the empty function.

* * * * *